United States Patent [19] [11] 3,876,707
Menet [45] Apr. 8, 1975

[54] DIENE SULPHONES
[75] Inventor: Albert Menet, La Mulatiere, Rhone, France
[73] Assignee: Rhone-Paulenc, S.A., Paris, France
[22] Filed: Apr. 9, 1973
[21] Appl. No.: 349,172

[30] Foreign Application Priority Data
Apr. 10, 1972 France .............................. 72.12475

[52] U.S. Cl. .......... 260/607 A; 260/583; 260/570.5; 260/470; 260/481 R; 260/465 R; 260/465.1; 260/666 R; 260/675.5
[51] Int. Cl. ......................................... C07c 147/04
[58] Field of Search ................................ 260/607 R

[56] References Cited
FOREIGN PATENTS OR APPLICATIONS
1,526,002   2/1967   France ............................... 260/607
1,483,715   6/1967   France ............................... 260/607

OTHER PUBLICATIONS
Trace; J. Org. Chem., Vol. 35, No. 12, 1970, 4217–4220.
Van Zuydewijn; Rec. Tran. Chimiques, 1047–1062.

Primary Examiner—Lewis Gotts
Assistant Examiner—D. R. Phillips
Attorney, Agent, or Firm—Stevens, Davis, Miller & Mosher

[57] ABSTRACT
Sulphones of the formula

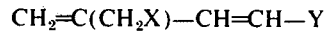

where one of X and Y is hydrogen and the other $SO_2R$, in which R is optionally substituted alkyl, alkenyl, aryl, aralkyl, or alkaryl are intermediates e.g. for adding isoprene units to terpenes.

6 Claims, No Drawings

DIENE SULPHONES

This invention relates to sulphones having an isoprene nucleus.

The present invention provides sulphones of the general formula:

$$CH_2 = C(CH_2X) - CH = CHY \quad (I)$$

in which one of the symbols X and Y is a hydrogen atom and the other represents the group $SO_2R$, wherein R represents an alkyl, alkenyl, aralkyl, alkylaryl or aryl radical, each of which radicals is unsubstituted or substituted by at least one electron-attracting or electron-donor group.

The radical R generally contains at most 15 carbon atoms when it is alkyl or alkenyl, six to 18 carbon atoms when it is alkylaryl or aryl and six to 19 carbon atoms when it is aralkyl. The aralkyl, alkaryl and aryl radicals are preferably hydrocarbon radicals. Examples of substituents for R are nitro, amino, nitrile, acyl, formyl, carboxyl, carboxylate, alkoxy, alkylthio, alkylsulphinyl and alkylsulphonyl groups.

Preferred radicals for R are allyl, 3-methyl-but-2-enyl, 3-methyl-buta-1,3-dienyl, isopropenyl, geranyl, farnesyl, methyl, ethyl, isopropyl, tertiary butyl, hexyl, dodecyl, phenyl, naphthyl, anthracenyl, tolyl, xylyl, benzyl, phenethyl and triphenylmethyl radicals.

These sulphones can be prepared by various routes. According to one process of the invention, an alkali metal sulphinate of formula $RSO_2M$, R being as defined above and M being an alkali metal e.g. sodium or potassium, is reacted with a chloride or a bromide or an iodide of formula $CH_2 = C(CH_2X_1)-CH=CH-Y$, wherein one of $X_1$ and $Y_1$ is hydrogen and the other is chlorine or bromine, or iodide for example, 2-chloromethyl-butadiene. The sulphones of the invention can also be obtained from compounds, which already contain the sulphone group, and which are subjected to a suitable treatment in order to produce the conjugated double bond. Thus when 4-chloro-3-methyl-but-2-enyl-sulphones or 4-bromo-3-methyl-but-2-enyl-sulphones are treated with an alkaline agent under dehydrohalogenation conditions the corresponding 3-methyl-butadienyl-sulphones are produced according to the following equation:

$$ClCH_2-C(CH_3)=CH-CH_2SO_2R \rightarrow$$
$$CH_2=C(CH_3)-CH=CHSO_2R$$

The alkaline agent is inorganic or organic, such as an alkali metal hydroxide or alcoholate, e.g. of one to six carbon atoms, a secondary or tertiary amine such as diethylamine, diisopropylamine, triethylamine, tributylamine or pyridine, or a quaternary ammonium hydroxide e.g. trimethylbenzylammonium hydroxide. The above processes can be carried out with or without a solvent. It is however preferable to choose a solvent so that the reaction takes place in a homogeneous phase. This solvent can be an alcohol such as methanol, ethanol and tertiary butyl alcohol or an ether such as diethyl ether, dioxane and tetrahydrofuran or any other inert solvent such as benzene, toluene, dimethylformamide or acetonitrile.

4-Halo-3-methyl-but-2-enyl sulphones of formula $X-CH_2-C(CH_3)=CH-CH_2SO_2R$, wherein X is halogen and R is as defined above, which may be used to prepare the sulphones of the invention are described and claimed in application Ser. No. 328,600 filed Feb. 1, 1973 in the name of Albert Menet, in which the sulphones are as above but R is a hydrocarbon radical or a substituted alkyl or aryl radical. They may be prepared by reacting a 1,4-dihalo-2-methyl-but-2-ene with an alkali metal sulphinate of formula $RSO_2M$ wherein R is as defined and M is an alkali metal.

The compounds of formula I are valuable products in organic synthesis by virtue of their reactivity due to the sulphone group and their conjugated double bonds. They can be used for introducing an isoprene group into terpene compounds. Thus sulphones of the formula:

$$CH_2=C(CH_2SO_2R)CH=CH_2 \quad (II)$$

can be reacted in the presence of base with terpene halides e.g. 3-methyl-but-2-enyl chloride to form sulphonated products, which on desulphonation by reduction form terpene compounds having one extra isoprene unit. e.g. myrcene useful in perfumery. These reactions are described in application Ser. No. 328,612 filed Feb. 1, 1973 by Pierre Chabardes, Marc Julia and Albert Menet, in which the sulphones of formula II have R representing alkyl, alkaryl or aryl.

Sulphones of the formula $CH_2=C(CH_3)-CH=CH-SO_2R$ (III) can be reacted in the presence of base with terpene sulphones e.g. phenyl 5-(2,6,6-trimethylcyclohex-1-enyl)-3-methyl-penta-2,4-dienyl sulphone to form disulphonated products, which with terpene halides e.g. retinyl chloride in the presence of base form longer chain disulphonated products, and these on treatment with an alkali metal alkoxide form terpenes e.g. $\beta$-carotene, a naturally occurring colourant. These reactions are described in application Ser. Nos. 328,624 and 328,537 filed Feb. 1, 1973 by Pierre Chabardes, Marc Julia and Albert Menet, in which the sulphones are of formula III with R representing alkyl, aralkyl or aryl.

The following Examples illustrate the preparation of products of the invention.

EXAMPLE 1

45 g of phenyl 4-chloro-3-methyl-but-2-enyl-sulphone and 240 cm³ of benzene are introduced into a 500 cm³ three-necked flask, equipped with a mechanical stirrer, a thermometer, a nitrogen inlet, a condenser and a dropping funnel. Whilst keeping the mixture at 5°C, a solution of 30.3 g of triethylamine in 60 cm³ of benzene is then added over the course of 30 minutes. The mixture is then allowed to return to ambient temperature and is stirred for 24 hours. The heterogeneous solution, which has formed, is then filtered and the filtrate is concentrated in vacuo. 38.8 g of a pale yellow solid, which contains 90% of sulphonated product, are thus obtained.

After recrystallisation from ethyl alcohol, a white solid is isolated, which melts at 70°C and is identified by infra-red spectrography and nuclear magnetic resonance as being 1-phenylsulphonyl-3-methyl-buta-1,4-diene. Degree of conversion of the starting sulphone: 100%. Yield: 90%.

Phenyl 4-chloro-3-methyl-but-2-enyl-sulphone was prepared by reacting equimolecular amounts of sodium phenylsulphinate and 1,4-dichloro-2-methyl-but-2-ene, by heating at 40°C in absolute ethyl alcohol.

EXAMPLE 2

9.84 g of sodium phenylsulphinate and 30 cm³ of dimethylsulphoxide are introduced into an apparatus identical to that of the preceding Example. A solution of 6.3 g of 2-chloromethyl-buta-1,4-diene containing 60% of pure product, in 10 cm³ of dimethylsulphoxide is then added over the course of 10 minutes and the mixture is stirred for 3 hours at 22°C. The reaction mixture is then poured into a mixture of 200 cm³ of water and 100 cm³ of diethyl ether and then the ether layer is decanted. The aqueous layer is extracted with three times 50 cm³ of diethyl ether. The ether layers are combined, dried over magnesium sulphate and concentrated. 82 g of a solid product are thus obtained, which, after recrystallisation from di-isopropyl ether melts at 64°C. This product is identified by infra red spectrography and nuclear magnetic resonance as being 2-phenylsulphonylmethyl-buta-1,4-diene.

Degree of conversion: 100%. Yield: 81%.

I claim:
1. A diene sulphone of the formula:

$$CH_2=C(CH_2X)-CH=CHY \quad (I)$$

in which one of the symbols X and Y is a hydrogen atom and the other represents the group $-SO_2R$, wherein R represents alkyl of at most 15 carbon atoms, or aryl or alkylaryl of six to 18 carbon atoms.

2. A sulphone according to claim 1, wherein R is methyl, ethyl, isopropyl, tertiary butyl, hexyl, dodecyl, phenyl, naphthyl, anthracenyl, tolyl, or xylyl.

3. A sulphone according to claim 1 of the formula:

$$CH_2=C(CH_2SO_2R)-CH=CH_2,$$

R being as defined in claim 1.

4. A sulphone according to claim 1 of the formula:

$$CH_2=C(CH_3)-CH=CHSO_2R,$$

R being as defined in claim 1.

5. 1-Phenylsulphonyl-3-methyl-buta-1,4-diene.
6. 2-Phenylsulphonylmethyl-buta-1,4-diene.

* * * * *